United States Patent Office 3,436,325
Patented Apr. 1, 1969

3,436,325
APPLICATION OF IRRADIATED MELTED WAX-POLYETHYLENE BLENDS TO SOLIDS
Alfred Aufhauser, 345 E. 56th St.,
New York, N.Y. 10022
No Drawing. Continuation of application Ser. No. 529,960, Aug. 22, 1955. This application Jan. 8, 1963, Ser. No. 250,025
Int. Cl. C08f 1/16; B01j 1/10
U.S. Cl. 204—159.2      6 Claims This application is a continuation of my application Ser. No. 529,960, filed Aug. 22, 1955, for "Irradiated Wax-Polyethylene Blend and Method of Making Same," and now abandoned.

The present invention is directed to wax-polyethylene blends which are particularly adapted for water-proofing of paper for cups, cartons, wrappers and the like.

Wax compositions for this purpose have been known and used, and generally in the form of a water emulsion. For instance, a paraffin wax having a melting point of 125° to 140° F. either alone or blended with other waxes, obtained from petroleum or natural waxes, have been emulsified in water with an emulsifier such as alkoxy ethers of higher fatty acids. Such compositions were found insufficient for the purpose and it was customary to add to the same polyethylene compounds having a relatively high molecular weight. Such mixtures gave improved results in the coating of paper but difficulties arose in the application thereof. Unless the composition was kept at a relatively high temperature, the polyethylene tended to separate from the wax, whereby a nonuniform coating was formed which was quite undesirable.

Attempts have been made to irradiate waxes in order to improve the physical properties thereof. Because of the relatively low molecular weight of the waxes it became necessary to subject them to high dosages for substantial length of time at high voltages resulting in surface discoloration of the waxes, which was highly undesirable. The amount of energy used in such irradiation was so great as to render the process uneconomical. The treatment also reduced the microcrystallinity of the wax.

The present invention is intended and adapted to overcome the difficulties and disadvantages of the prior art, it being among the objects of the present invention to provide a wax composition which is a blend of a hydrocarbon or paraffin wax with a solid polyethylene compound, which composition is uniform and in which the ingredients are compatible at ordinary room and at elevated temperatures.

It is also among the objects of the present invention to provide a wax-polyethylene composition, which may be applied to paper or the like without the necessity of continual heating and continual agitation thereof to prevent separation of the constituents.

It is further among the objects of the present invention to provide a process which is simple, inexpensive and does not require the services of highly skilled operators.

The invention is based upon the discovery that a mixture or blend of a hydrocarbon wax and polyethylene may be irradiated under certain conditions whereby the composition becomes homogeneous and does not require any heating to maintain the composition in uniform state. It is believed that due to bombardment of the composition by high energy electrons, a reaction takes place which is most likely chemical in nature, whereby the ingredients form cross linkages so that they are intimately associated. Whether the linkage is physical or chemical, the result is that the blend is compatible and will not separate under ordinary conditions of use.

Because of the interlinkage of the wax with the polyethylene, the tensile strength of the resulting cross-linked product is increased. Only a relatively small amount of irradiation is necessary and the curve of tensile strength versus irradiation reaches a peak, at which point the process is interrupted to give maximum benefits. The amount of irradiation is so small that there are no material adverse effects on the desirable physical properties of the blend. The cost of improving the present products is so low as to be economical. With the blend containing polyethylene, there is less tendency to develop color in the product than is the case where wax alone is irradiated. By the use of an inert atmosphere during the irradiation, the development of color may be eliminated.

While paraffin wax is the preferred material, other hydrocarbon waxes such as mineral or earth waxes may be used. The polyethylene adapted for the invention has a wide range of molecular weights and may be added to the hydrocarbon wax in a wide range of proportions. The waxes used generally have about 25 to 50 carbon atoms with molecular weights of about 360 to 700, the range of melting points being about 130° to 200° F. The polyethylenes used generally have molecular weights ranging from about 5,000 to 20,000. The proportion of polyethylene blended with the wax is about 2% to 25%. The products are applied to paper in the usual manner as, for example, at temperatures above the melting point of the product.

The irradiation is accomplished by a high voltage source such as electron bombardment from a 2,000,000 volt electrostatic accelerator. The voltage used and the time of treatment may vary and generally it has been found that the more energy that is introduced into the composition the better are the results up to the optimum. With higher voltages a shorter time of treatment is necessary. The dosages may vary widely, say, from 2 to 200 megarads. A rad is the energy represented by 100 ergs per gram of composition and the megarad is equal to 1,000,000 rads. The preferred dosage is 60 to 90 megarads.

The following is a specific example which illustrates the nature of the invention without limiting the same.

EXAMPLE 1

A blend is made of 82 parts by weight of a paraffin wax having a melting range between 130° and 135° F. and 18 parts by weight of polyethylene having a molecular weight of 8,000. A sheet of the above blend having a thickness of ¼ inch is passed on a continuously moving conveyor belt at the rate of 40 inches per minute beneath the outlet tube of an electrostatic generator at room temperature. A type A, model D, 2,000,000 volt Van de Graaff accelerator is used. It is well known, as described in the article entitled, "Van de Graaff Accelerators for Sterilization Use," by Foster, Dewey and Gale, appearing in Nucleonics, October 1953, pp. 14–17. The irradiation is continued until 80 megarads ($80 \times 10^6$ reps) per gram have been absorbed.

The product has a solidification point of 178°–180° F. and an A.S.T.M. penetration of 32–34. In use it is held at temperatures of 200°–210° F. and coated on paper or the like, such as bread wrappers. There is no tendency for either of the constituents to separate out at ordinary temperatures. The color of the product is almost water white and is no darker than the starting material. The product is homogeneous and the tensile strength is substantially greater than that of the same composition before it has been irradiated.

A greater surface area may be covered by the new products and the coated surface has a higher gloss and seal strength. It shows greater flexibility.

The invention is applicable to various types of waxes such as Mid-continent waxes having melting points between about 155° and 200° F. and Pennsylvania waxes having melting points between about 140° to 155° F. As a result of the present invention, high molecular weight polyethylenes are now usable with improved properties imparted to the wax so that molecular weight compounds even higher than 20,000 may be used. With the high molecular weight materials, a smaller proportion of the relatively expensive polyethylenes may be used with good results. The thickness of the layer being irradiated may vary depending upon the voltage of the source of energy so that the radiation will penetrate throughout the layer.

In the procedure, the blend need not be in the form of a sheet but may be in granular or powdered form for irradiation. The blend may be passed under the source of energy two or more times and the amount of irradiation may be varied within relatively wide limits.

The products of the present invention have a considerable variety of use as, for instance, the impregnation of cloth, leather, paper and the like. They may be used as a shock retardant in explosive cartridges. Metallic surfaces such as various types of vessels may be coated with the products to prevent rust or corrosion and they may be used as linings for containers so as to render the surface thereof inert to various gases and moisture. The products may be used in electrical insulation for waxing textile filaments, as a binder for such materials as cork, and other established uses.

I claim:

1. In a process wherein a hydrocarbon wax having a softening point between about 130° F. and 200° F. is blended with solid polyethylene, said polyethylene constituting from about 2% to about 25% by weight of the blend, the blend is applied to a solid substance by contacting said substance with said blend while said blend is at a temperature above the melting point of the blend, and said solid substance having said blend applied thereto thereafter is cooled to a temperature below said melting point; the improvement which comprises subjecting said blend prior to its said application to said substance to ionizing irradiation with high energy electrons, the dosage being from about 2 to about 200 megarads, thereby improving the compatibility and homogeneity of the blend for use as aforesaid.

2. A process according to claim 1 wherein the dosage of said radiation is from about 60 to about 90 megarads.

3. In a process wherein a hydrocarbon wax having a softening point between about 130° F. and 200° F. is blended with solid polyethylene, said polyethylene constituting from about 2% to about 25% by weight of the blend, the blend is applied to a solid substance by contacting said substance with said blend while said blend is at a temperature above the melting point of the blend, and said solid substance having said blend applied thereto thereafter is cooled to a temperature below said melting point; the improvement which comprises utilizing as said blend a blend composed as aforesaid which has been subjected prior to its said application to said substance to ionizing irradiation with high energy electrons, the dosage being from about 2 to about 200 megarads, thereby improving the compatibility and homogeneity of the blend for use as aforesaid.

4. In the production of a blend of a hydrocarbon wax and solid polyethylene adapted for use in a process wherein the blend is applied to a solid substance by contacting said substance with said blend while said blend is at a temperature above the melting point of the blend, said hydrocarbon wax having a melting point between about 130° F. and about 200° F. and said polyethylene constituting from about 2% to about 25% by weight of the blend, the improvement which comprises improving the compatibility and homogeneity of said blend for said use by subjecting said blend to about 2 to about 200 megarads of irradiation with high energy electrons.

5. Paper presenting a surface having thereon as a coating therefor a blend of hydrocarbon wax having a melting point between about 130° F. and 200° F. and solid polyethylene, said polyethylene constituting from about 2% to about 25% by weight of the blend, and said coating being the product of blending said wax and said polyethylene to produce a blend composed as aforesaid, subjecting the said resulting blend to about 2 to about 200 megarads of irradiation with high energy electrons, thereafter applying said blend in a melted condition to said surface and cooling the coating to solidify the blend.

6. A method of coating paper with a blend of hydrocarbon wax and solid polyethylene which comprises subjecting a blend of solid polyethylene and hydrocarbon wax having a melting point between about 130° F. and about 200° F., said polyethylene constituting from about 2% to about 25% by weight of said blend, to ionize radiation with high energy electrons, the dosage being from about 2 to about 200 megarads whereby resistance of the blend to separating out of the polyethylene component of the blend is improved, thereafter applying the blend to a surface of said paper to coat said surface while said blend is at a temperature above its melting point, and cooling the resulting coating to a temperature below said melting point of said blend.

References Cited

UNITED STATES PATENTS

| | | | |
|---|---|---|---|
| 2,698,309 | 12/1954 | Thwaites et al. | 260—28.5 |
| 2,706,719 | 4/1955 | Newberg et al. | 260—28.5 |

OTHER REFERENCES

Charlesby, "Proceedings Royal Society, London," vol. 222A, pp. 60–74, Feb. 23, 1954.

Charlesby, "Nucleonics," pp. 18–25, June 1954.

Sun, "Modern Plastics, vol. 32, September 1954, pp. 141–144, 146, 148, 150, 229–233, 236, 237.

Martin, "Chemical and Engineer News," vol. 13, April 1955, pp. 1424–1428.

SAMUEL H. BLECH, *Primary Examiner.*

RICHARD B. TURER, *Assistant Examiner.*

U.S. Cl. X.R.

117—93.3, 155, 132, 161; 260—28.5